(12) United States Patent
Kim et al.

(10) Patent No.: US 8,161,842 B2
(45) Date of Patent: Apr. 24, 2012

(54) APPARATUS FOR GENERATING HYSTERESIS OF ELECTRONIC ACCELERATOR PEDAL FOR A VEHICLE

(75) Inventors: Donghwan Kim, Ulsan (KR); Yonghwan Mo, Ulsan (KR); Byungju Kim, Daegu (KR); Jongrae Lee, Ulsan (KR)

(73) Assignees: Donghee Industrial Co., Ltd., Ulsan (KR); DH Holdings Co., Ltd., Ulsan (KR)

( * ) Notice: Subject to any disclaimer, the term of this patent is extended or adjusted under 35 U.S.C. 154(b) by 170 days.

(21) Appl. No.: 12/712,088

(22) Filed: Feb. 24, 2010

(65) Prior Publication Data

US 2011/0094331 A1 Apr. 28, 2011

(30) Foreign Application Priority Data

Oct. 27, 2009 (KR) .................. 10-2009-0102079

(51) Int. Cl.
*B60K 26/02* (2006.01)
(52) U.S. Cl. ................ 74/513; 74/514; 74/560
(58) Field of Classification Search ............ 74/512–514, 74/531, 560; 411/24, 25, 27, 537, 538; 403/109.5, 403/314, 368, 374.5
See application file for complete search history.

(56) References Cited

U.S. PATENT DOCUMENTS

| | | | | |
|---|---|---|---|---|
| 914,103 | A * | 3/1909 | Berry | 411/24 |
| 3,166,950 | A * | 1/1965 | Pomeranz | 74/526 |
| 4,209,080 | A * | 6/1980 | Douglas | 184/6.16 |
| 6,089,120 | A | 7/2000 | Lochle et al. | |
| 7,216,563 | B2 * | 5/2007 | Willemsen et al. | 74/512 |
| 2002/0100341 | A1 * | 8/2002 | Kumamoto et al. | 74/512 |
| 2002/0157495 | A1 * | 10/2002 | Goto et al. | 74/512 |
| 2006/0230875 | A1 * | 10/2006 | Ouyang | 74/560 |
| 2007/0240534 | A1 * | 10/2007 | Makino | 74/513 |

FOREIGN PATENT DOCUMENTS

| | | | |
|---|---|---|---|
| EP | 0748713 | A2 | 12/1996 |
| EP | 1777095 | A2 | 4/2007 |
| JP | 2000-255283 | A | 9/2000 |
| JP | 2002-114052 | A | 4/2002 |
| JP | 2007-213332 | A | 8/2007 |
| KR | 10-2005-0123468 | A1 | 12/2005 |
| KR | 10-0724700 | B1 | 5/2007 |

* cited by examiner

*Primary Examiner* — James Pilkington
*Assistant Examiner* — Thomas Diaz
(74) *Attorney, Agent, or Firm* — LRK Patent Law Firm

(57) ABSTRACT

An apparatus for generating hysteresis of an electronic accelerator pedal for a vehicle is provided, which includes a pedal arm that is pivotably connected to a housing; a friction block that is provided to be in contact with an inner wall of the housing; a friction block hole that is formed through the friction block to fit the fitting protrusion and has an elliptical shape in the longitudinal direction of the pedal arm such that the friction block fitted on the fitting protrusion slides on the bottom of the friction block mounting groove; a spring seat that is provided to be seated on the friction block; and an inner spring and an outer spring each of which one end is supported against the upper inner surface of the housing and the other is supported by the spring seat.

8 Claims, 7 Drawing Sheets

APPARATUS FOR GENERATING HYSTERESIS OF ELECTRONIC ACCELERATOR PEDAL FOR A VEHICLE

CROSS-REFERENCE TO RELATED APPLICATIONS

The present application claims priority to Korean Patent Application Number 10-2009-0102079 filed Oct. 27, 2009, the entire contents of which application is incorporated herein for all purposes by this reference.

BACKGROUND OF THE INVENTION

1. Field of the Invention

The present invention relates to an apparatus for generating hysteresis of an electronic accelerator pedal for a vehicle.

2. Description of Related Art

In general, the accelerator pedal of vehicles is a device for adjusting the number of revolution of the engines by adjusting the intake amount of gas mixture in gasoline engines and the jet amount of fuel in diesel engines.

Most accelerator pedals widely used in recent years are mechanical accelerator pedals that adjust the amount of fuel by opening/closing the throttle valve in the carburetor, using the accelerator cable.

However, such mechanical accelerator pedals have a problem that the throttle valve and the injection pump make an error in operational range, when the tension of the accelerator cable is changed by aging or changes in the environment.

In recent years, electronic accelerator pedals that electronically control the engine and the peripheral parts have been developed to overcome the defects. In the electronic accelerator pedals, a pedal arm 2 pivots clockwise about a hinge shaft 3 when a driver presses down a pedal pad 1 shown in FIG. 1, and a sensor lever (not shown) connected with pedal arm 2 pivots by the rotation of pedal arm 2.

As the sensor lever rotates, a sensor 5 attached to a housing 4 detects an output value corresponding to the rotation of the sensor lever and transmits an electric signal to a throttle control unit, and then the throttle control unit transmits a control signal such that an actuator opens/closes the throttle valve to adjust the combustion amount.

Since such electronic accelerator pedals are not provided with an accelerator cable, the space can be saved. Further, since they are not affected by changes in tension of the cable, a driver can more smoothly operate them with reduced fatigue and it is possible to reduce fuel consumption by improving fuel efficiency.

These electronic accelerator pedals are generally equipped with an apparatus for generating hysteresis which can considerably reduce fatigue of a driver operating pedal pad 1, by making the force when the driver presses down pedal pad 1 different from the force applied from pedal pad 1 to the driver's foot when the driver releases pedal pad 1.

However, since apparatuses for generating hysteresis that have been used for electronic accelerator pedals in the related art have a large number of hinged parts, such as bolts and pivots, it is difficult to assemble them and accordingly, the assembly time significantly increases and the productivity decreases.

That is, an apparatus for generating hysteresis in the related art, as shown in FIGS. 1 and 2, includes a spring plate 7 that is rotatably linked to pedal arm 2 by a pivot 6, a friction shoe 9 of which an end is rotatably linked to pedal arm 2 by a pivot 8 and the other end is disposed to contact the inner surface of housing 4 and spring plate 7, an inner spring 10 and an outer spring 11 of which the upper ends are fixed to the upper inner surface of housing 4 and the lower ends are fixed to the spring plate 7, and a spring pad 12 a spring pad 12 that is interposed between the inner spring 10 and the outer spring 11.

As a driver presses down pedal pad 1, friction shoe 9 rotate counterclockwise about pivot 8 from the position shown in FIG. 1 and produces friction in contact with the inner surface of housing 4. Accordingly, the driver should press down pedal pad 1 against the friction force of friction shoe as well as inner spring 10 and outer spring 11.

On the contrary, when the driver releases pedal pad 1, the force applied to the driver's foot from pedal pad 1 by the friction force of friction shoe 9 becomes relatively smaller than the force when the driver presses down pedal pad 1. Therefore, hysteresis can be generated and fatigue of the driver operating pedal pad 1 is considerably reduced.

However, the apparatus for generating hysteresis in the relate art needs a several hinged parts, such as pivot 6 for linking spring plate 7 with pedal arm 2 and pivot 8 for liming friction shoe 9 with pedal arm 2, such that assembly is difficult, a large amount of time is required for the assembly, and accordingly, productivity is deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to considerably improve productivity as well as improving the assembly work and reducing the assembly time, by providing an apparatus for generating hysteresis of an accelerator pedal for a vehicle that has an improved structure without hinged parts, such as bolts and pivots, while maintaining the function of generating hysteresis.

An aspect of the prevent invention provides an apparatus for generating hysteresis of an electronic accelerator pedal that includes: a pedal arm that is pivotably connected to a housing, and has a friction block mounting groove and a fitting protrusion integrally formed on one end disposed in the housing and a slope on the bottom of the friction block mounting groove; a friction block that is fitted on the fitting protrusion and positioned in the friction block mounting groove to be able to slide on the bottom of the friction block mounting groove, with the portion protruding from the friction block mounting groove being in contact with the inner wall of the housing; a spring seat that is fitted on the fitting protrusion to be seated on the friction block, and has a seat-protrusion surface at the bottom which is a slope contacting the friction block; and an inner spring and an outer spring each of which one end is supported against the upper inner surface of the housing and the other end is supported by the spring seat.

According to an embodiment of the present invention, it is possible to improve the assembly work, reduce the assembly time, improve productivity, reduce the manufacturing cost, the weight, and fuel consumption, by simplifying the parts of the apparatus for generating hysteresis of the electronic accelerator pedal.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Figure 1:
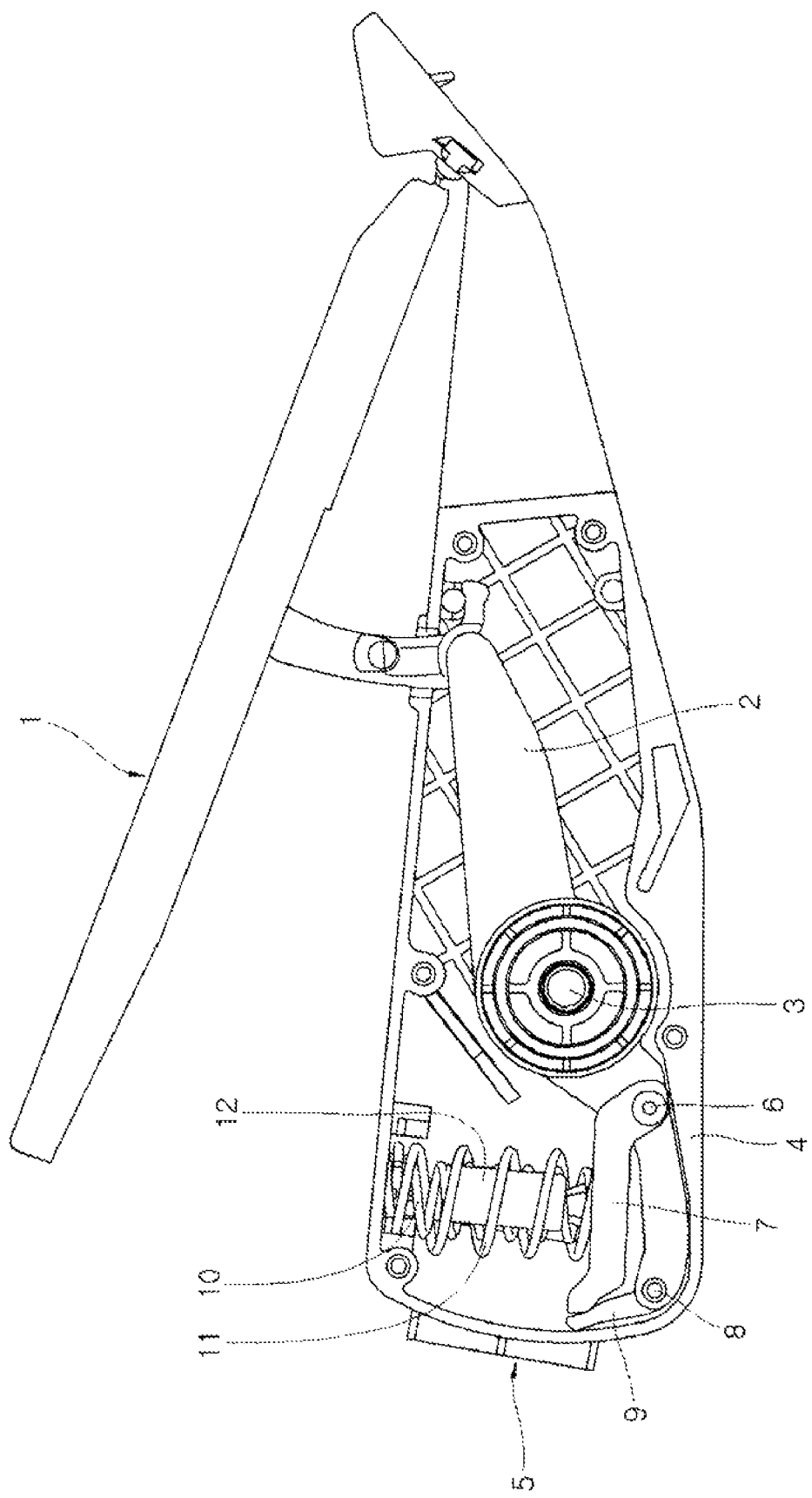
FIG. 1 is a view showing an accelerator pedal equipped with an apparatus for generating hysteresis in the related art.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Preferred embodiments of the present invention are described hereafter with reference to the accompanying drawings.

An electronic accelerator pedal mechanism for a vehicle which is equipped with an apparatus for generating hysteresis according to an embodiment of the present invention, as shown in FIGS. 3 to 7, includes a housing 20 that is fixed to the dash panel under the driver's seat, a pedal arm 30 that a driver presses down to operate, and a sensor 40 that is attached to a side of housing 20 and activated when pedal arm 30 pivots.

A pedal pad 31 that a driver presses down with a foot is integrally formed at one end of pedal arm 30, and a friction block mounting groove 32 and a fitting protrusion 33 are integrally formed on the upper surface of the other end in housing 20.

Pedal arm 30 is positioned by fitting a cylindrical portion 34 on a hinge shaft 21 in housing 20, such that it pivots about hinge shaft 21 when a driver presses down pedal pad 31.

Fitting protrusion 33 protrudes upward from the center portion on friction block mounting groove 32 and is composed of at least two partial protrusions 33b divided by a longitudinal cutting groove 33a.

A hook 33c having a triangular cross section is integrally formed on the upper end outer circumference of each of partial protrusions 33b.

A plurality of anti-rotating portions 35 is integrally formed on pedal arm 30, in which anti-rotating portions 35 are disposed at a side of friction block mounting groove 32 in the longitudinal direction of pedal arm 30 and protrude toward fitting protrusion 33 in parallel with each other.

The bottom 32a of friction block mounting groove 32 is inclined such that the bottom 32a declines toward the inner wall 22 of housing 20 from the position of fitting protrusion 33 vertically standing toward the inner upper surface of housing 20.

A friction block 50 is disposed in friction block mounting groove 32, where friction block 50 is fitted on fitting protrusion 33 and then positioned in friction block mounting groove 32.

Further, friction block 50 can slide on bottom 32a of the friction block mounting groove 32 after being positioned in friction block mounting groove 32, and the protruding portion from friction block mounting groove 32 contacts inner wall 22 of housing 20.

A friction block hole 51a is formed through friction block 50 to be fitted on fitting protrusion 33 and has a elliptical shape in the longitudinal direction of the pedal arm 30 such that friction block 50 fitted on fitting protrusion 33 can slide on bottom 32a of friction block mounting groove 32.

Friction block 50 is composed of a body 51 that has friction block hole 51a and is disposed in friction block mounting groove 32 and a protruding portion 52 that protrudes slantly upward from body 51 and has one end contacting inner wall 22 of housing 20.

Friction block 50 is positioned such that the bottom of body 51 is in surface contact with bottom 32a of friction block mounting groove 32 in order for friction block 50 to be able to smoothly slide on the slope of bottom 32a.

A spring seat 60 is fitted on fitting protrusion 33 passing through friction block hole 51a, after friction block 50 is positioned in friction block mounting groove 32.

A guide protrusion 61 protrudes upward from the center portion of spring seat 60 and a protrusion hole 62 through which fitting protrusion 33 passes is formed through guide protrusion 61.

Therefore, as fitting protrusion 33 of pedal arm 30 is fitted into protrusion hole 62 of spring seat 60, partial protrusions 33b of fitting protrusion 33 pass through protrusion hole 62 while elastically closed, and then closed partial protrusions 33b are opened after hooks 33c completely pass through protrusion hole 62.

Accordingly, the bottoms of hooks 33c are locked to the upper end of guide protrusion 61, such that spring seat 60 is not pulled out from fitting protrusion 33 of pedal arm 30.

An inclined seat-protruding surface 63 is integrally formed on the bottom of spring seat 60 such that it slopes up to inner wall 22 of housing 20 from fitting protrusion 33 vertically standing toward the upper inner surface of housing 20.

Seat-protruding surface 63 is in surface contact with the upper surface of body 51 of friction block 50, when spring seat 60 is fitted on fitting protrusion 33.

That is, the bottom and the upper surface of body 51 of friction block 50 are in surface contact with bottom 32a of friction block mounting groove 32 and seat-protruding surface 63 of spring seat 60, respectively, in order that friction block 50 can smoothly slides along the inclined surfaces of bottom 32a and seat-protruding surface 63, when spring seat 60 is moved to friction block mounting groove 32 by external force applied to spring seat 60.

Further, if spring seat 60 rotates about fitting protrusion 33 when force is applied to spring seat 60 toward friction block mounting groove 32, the force applied to friction block 50 by spring seat 60 is distributed and accordingly friction block 50 cannot move along the inclined surfaces of bottom 32a of friction block mounting groove 32 and seat-protruding surface 63 of spring seat 60.

In order to preclude this situation, spring seat 60 has a structure preventing rotation about fitting protrusion 33 after fitted in fitting protrusion 33.

That is, a seat block 64 that is inserted between anti-rotating portions 35 of pedal arm 30 integrally protrudes from the outer circumference of spring seat 60, such that spring seat 60 cannot be rotated by seat block 64 stuck in between anti-rotating portions 35.

Further, an apparatus for generating hysteresis according to an embodiment of the present invention includes an inner spring 71 and an outer spring 73 of which the upper ends are supported against a spring-locking protrusion 23 formed on the upper inner surface of housing 20 and the lower ends are supported by spring seat 60.

Inner spring 71 and outer spring 73 may be implemented by one spring having the same elasticity as them.

A spring pad 75 is interposed between inner spring 71 and outer spring 73 to prevent interference and noise between inner spring 71 and outer spring 73.

On the other hand, pedal arm 30 has a lever-fitting protrusion 36 integrally protruding from a side of friction block mounting groove 32 and lever-fitting protrusion 36 is fitted in a sensor lever (not shown) of a sensor 40 attached to the side of housing 20, through the side of housing 20.

Therefore, as pedal arm 30 pivots, level-fitting protrusion 36 and sensor lever rotates. Further, as the sensor lever rotates, sensor 40 attached to housing 20 detects changes in output values by the rotation of the sensor lever and transmits an electric signal to a throttle valve. As a result, a throttle control unit operates an actuator by transmitting a control signal to adjust the combustion amount by opening/closing the throttle valve.

The operation of the embodiment of the present invention is described hereafter.

Figure 4:
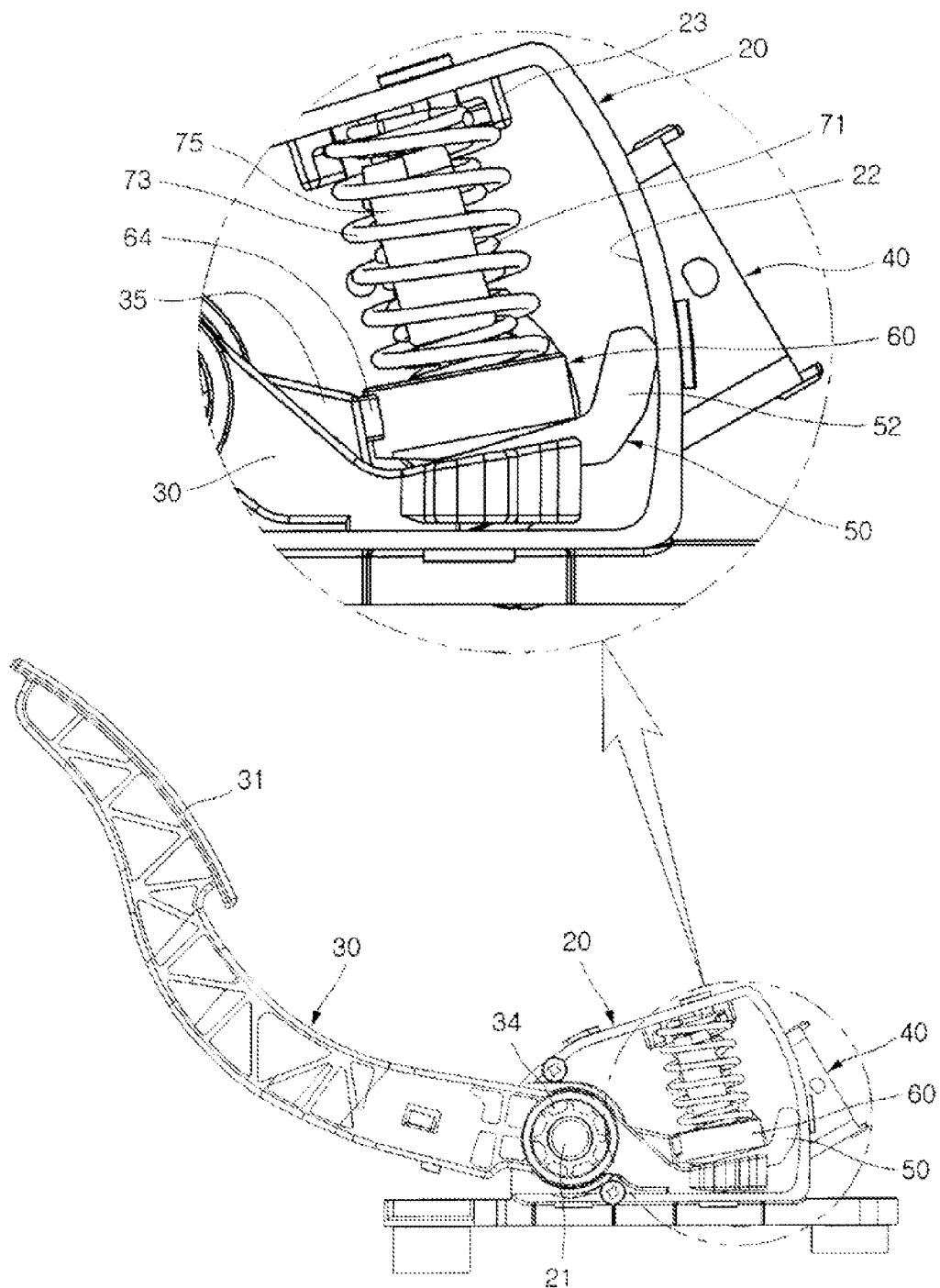
Figure 5:
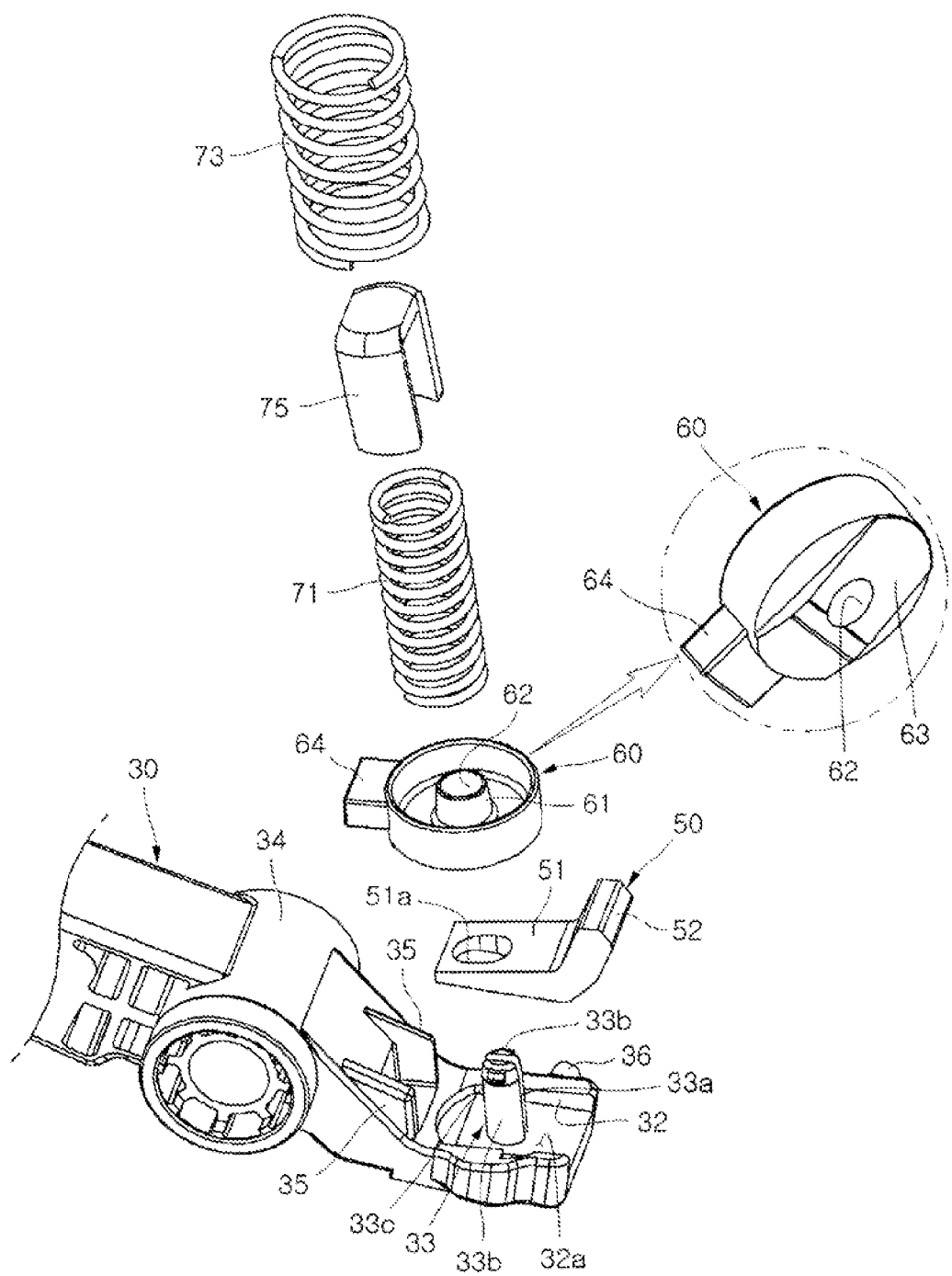
FIGS. 5 to 7 are views illustrating an apparatus for generating hysteresis according to an embodiment of the present invention.
Figure 6:
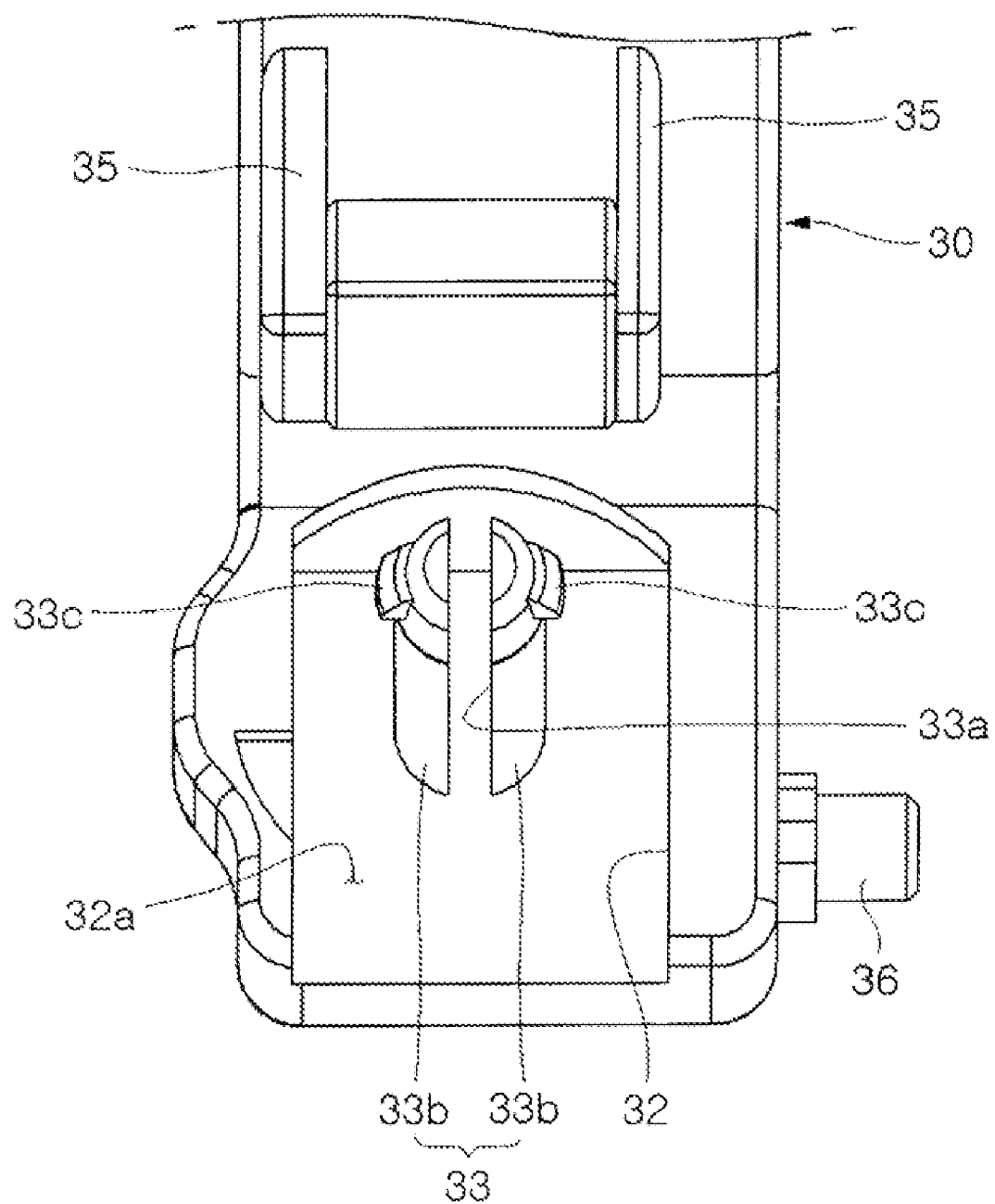

As a driver presses down pedal pad 31 of pedal arm 30 positioned as shown in FIG. 4, pedal arm 30 pivots counterclockwise about hinge shaft 21, inner spring 71 and outer spring 73 are compressed, sensor 40 transmits an electric signal corresponding to the amount of pivot of pedal arm 30 to the throttle control unit, and the throttle control unit operates the actuator by transmitting a control signal to adjust the combustion amount by opening/closing the throttle valve.

When the pressed pedal pad 31 is released, pedal arm 30 that has pivoted counterclockwise pivots clockwise to the initial position shown in FIG. 4 by the restoring force of inner spring 71 and outer spring 73, and stands by the next operation.

Figure 7:
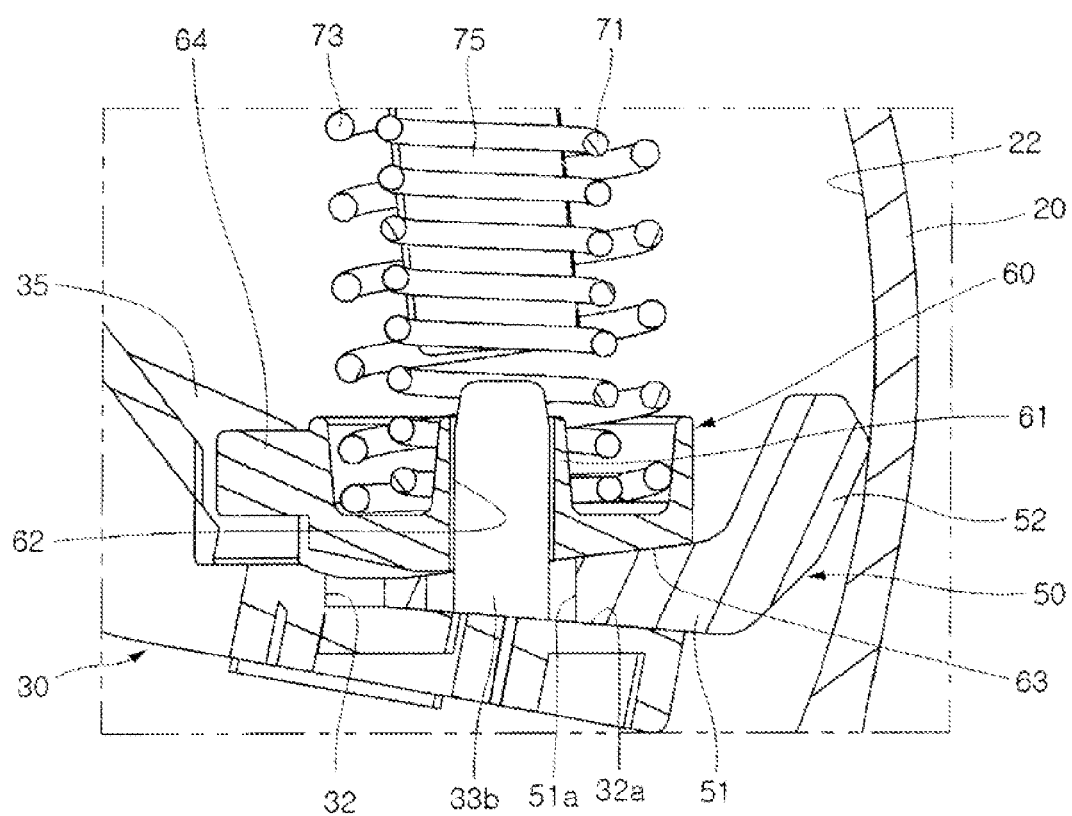

Meanwhile, the end of protruding portion 52 of friction block 50 is maintained in contact with inner wall 22 of housing 20, as shown in FIG. 7, before the driver presses down pedal pad 31.

A the driver presses down pedal pad 31 and pedal arm 30 pivots counterclockwise, protruding portion 52 being in contact with inner wall 22 of housing 20 comes off inner wall 22 by the pivot of pedal arm 30 about hinge shaft 21.

However, inner spring 71 and outer spring 73 are compressed, when the driver presses down pedal pad 31 and pedal arm 30 pivots counterclockwise, and the restoring force of compressed springs 71 and 73 are transmitted to spring seat 60.

Since the restoring force of inner spring 71 and outer spring 73 is applied to spring scat 60, force is exerted in spring seat 60 toward friction block mounting groove 32 in the longitudinal direction of fitting protrusion 33. Further, the force is transmitted to friction block 50, such that friction block 50 can smoothly slide toward inner wall 22 of housing 20 along bottom 32a of friction block mounting groove 32 and seat-protruding surface 63 of spring seat 60, which are inclined, by the pressing force transmitted through spring seat 60.

As a result, the end of protruding portion 52 of friction block 50 is kept in contact with inner wall 22 of housing 20 even though driver presses down pedal pad 31 such that pedal arm 30 pivots counterclockwise.

Therefore, the driver should apply force larger than the sum of the elastic force of inner spring 71 and outer spring 73 and the friction force of protruding portion 52 to press down pedal pad 31.

However, the force applied to the driver's foot from pedal pad 31 by the friction force of protruding portion 52 is relatively reduced than the force when the driver presses down pedal pad 31, when the pressed pedal pad 31 is released.

Therefore, the accelerator pedal according to an embodiment of the present invention can generate hysteresis, such that fatigue that the user feels when operating pedal pad 31 is considerably reduced.

The accelerator pedal according to an embodiment of the present invention can generate hysteresis and the apparatus for generating hysteresis does not use hinged parts, such as bolts and pivots, such that the assembly work becomes considerably easy.

Figure 2:
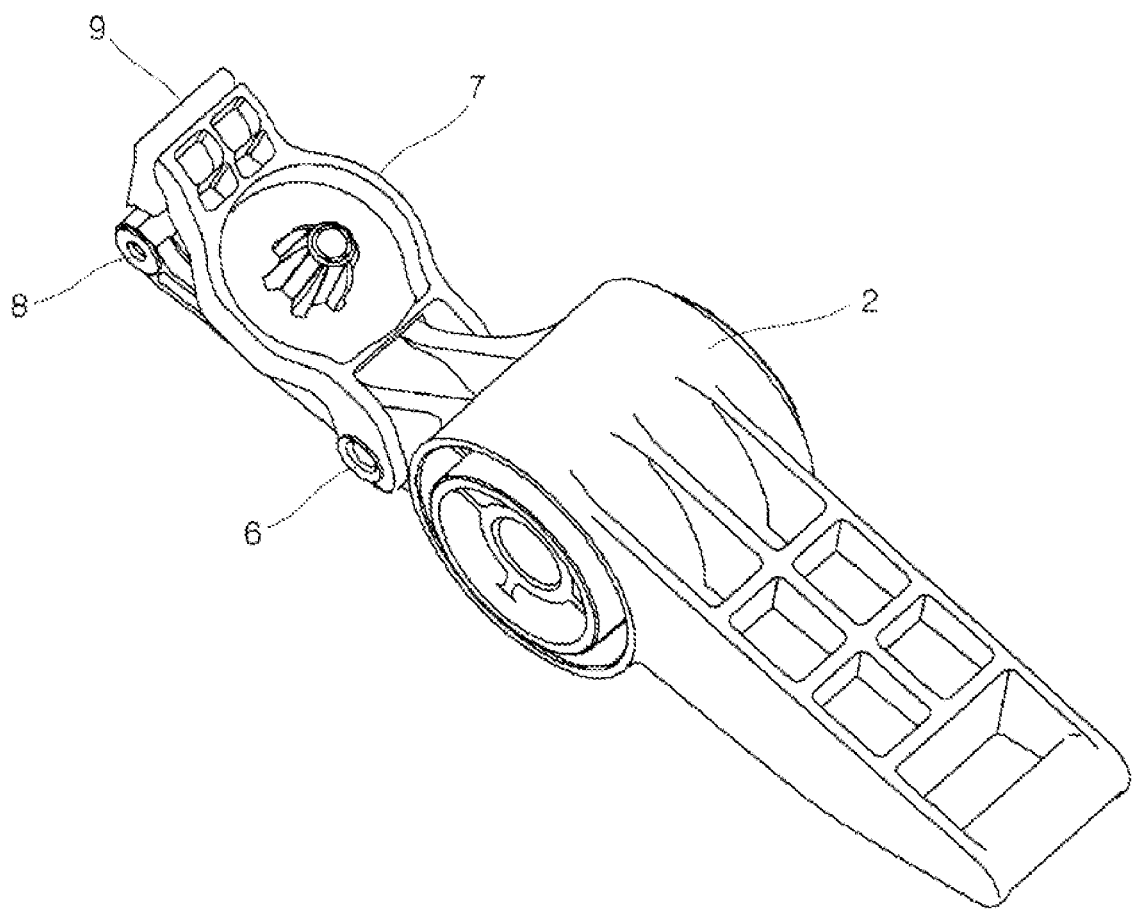
FIG. 2 is a view illustrating the apparatus for generating hysteresis in the related art.
Figure 3:
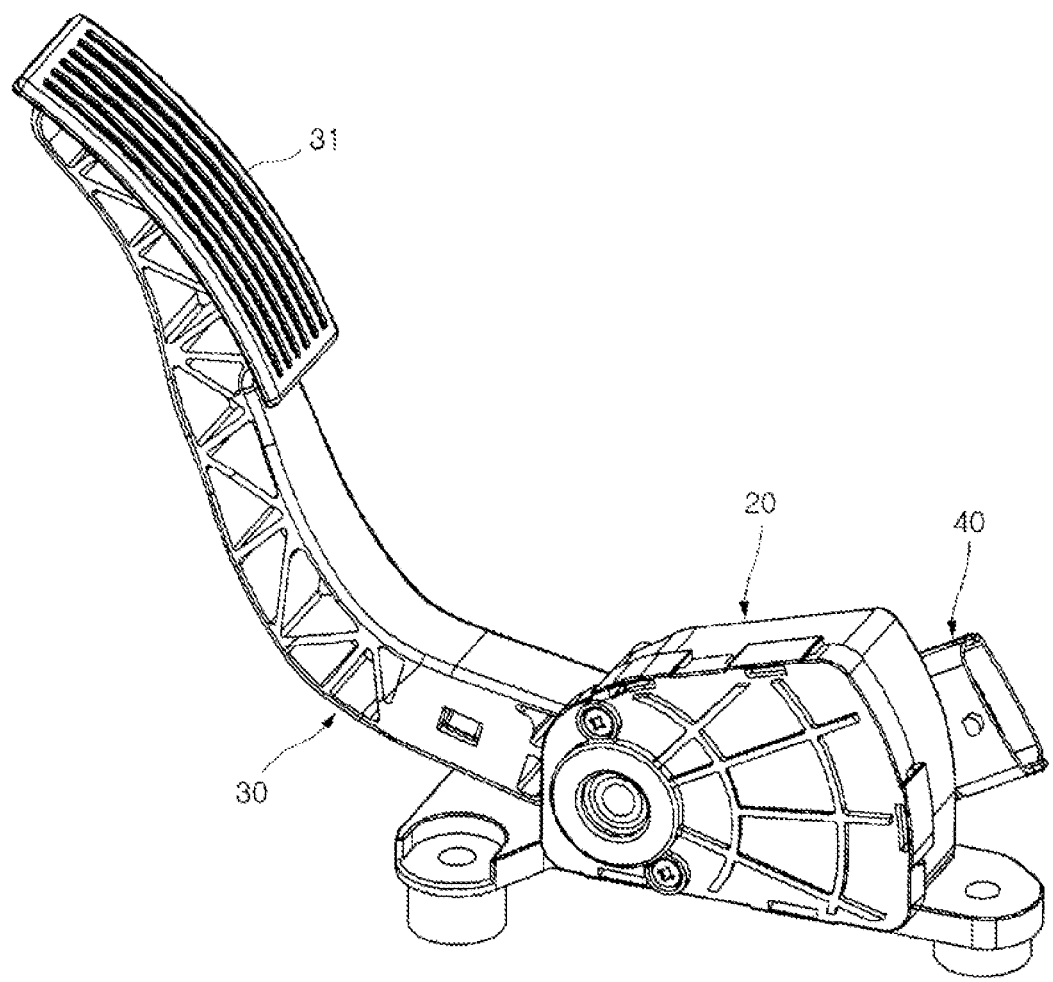
FIGS. 3 and 4 are views showing an accelerator pedal equipped with an apparatus for generating hysteresis according to an embodiment of the present invention.

That is, the apparatus for generating hysteresis of the related art described with reference to FIGS. 1 and 2 employs a plurality of hinged parts, such as pivot 6 used for assembling pedal arm 2 and spring plate 7 and pivot 8 used for assembling pedal arm 2 and friction shoe 9; however, since the apparatus for generating hysteresis according to an embodiment of the present invention uses a way friction block 50 and spring seat 60 is simply fitted on fitting protrusion 33 in the one-touch way, it is possible to improve the assembly work, reduce the assembly time, and improve productivity.

Further, the present invention makes it possible to reduce the manufacturing cost, the weight, and fuel consumption by reducing the number or parts, and also achieve a compact produce by reducing the size of housing 20.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for generating hysteresis of an electronic accelerator pedal of a vehicle, the apparatus comprising:
    a pedal arm that is pivotably connected to a housing, and has a friction block mounting groove and a fitting protrusion integrally formed on one end disposed in the housing and a slope on the bottom of the friction block mounting groove;
    a friction block that is fitted on the fitting protrusion and positioned in the friction block mounting groove to be able to slide on the bottom of the friction block mounting groove, with a portion protruding from the friction block mounting groove being in contact with an inner wall of the housing;
    a spring seat that is fitted on the fitting protrusion to be seated on the friction block, and has a seat-protrusion surface at the bottom of which is a slope contacting the friction block; and
    an inner spring and an outer spring each of which one end is supported against an upper inner surface of the housing and the other end is supported by the spring seat, wherein a friction block hole is formed through the friction block to fit the fitting protrusion and has an elliptical shape in the longitudinal direction of the pedal arm such that the friction block fitted on the fitting protrusion slides on the bottom of the friction block mounting groove.

2. The apparatus as defined in claim 1, wherein the bottom of the friction block mounting groove is declined toward the inner wall of the housing and the seat-protruding surface of the spring seat is sloped up toward the inner wall of the housing, from the fitting protrusion vertically standing toward the upper inner surface of the housing, and the bottom and the upper surface of the friction block are in surface contact with the bottom of the friction block mounting groove and the seat-protruding surface of the spring seat, respectively.

3. The apparatus as defined in claim 1, wherein the friction block includes:
a body that has the friction block hole and of which the bottom and the upper surface are in surface contact with the bottom of the friction block mounting groove and the seat-protruding surface of the spring seat, respectively; and
a protruding portion that protrudes upward from the body and has an end contacting the inner wall of the housing.

4. The apparatus as defined in claim 1, wherein the fitting protrusion includes at least two partial protrusions divided by a longitudinal cutting groove.

5. The apparatus as defined in claim 4, wherein a hook having a triangular cross section is integrally formed on the upper end outer circumference of each of the partial protrusions.

6. The apparatus as defined in claim 5, wherein a guide protrusion protrudes upward from the center portion of the spring seat, and a protrusion hole is formed through the guide protrusion to fit the fitting protrusion.

7. The apparatus as defined in claim 6, wherein the hooks are locked to the upper end of the guide protrusion after passing through the protrusion hole.

8. An apparatus for generating hysteresis of an electronic accelerator pedal of a vehicle, the apparatus comprising:
a pedal arm that is pivotably connected to a housing, and has a friction block mounting groove and a fitting protrusion integrally formed on one end disposed in the housing and a slope on the bottom of the friction block mounting groove;
a friction block that is fitted on the fitting protrusion and positioned in the friction block mounting groove to be able to slide on the bottom of the friction block mounting groove, with a portion protruding from the friction block mounting groove being in contact with an inner wall of the housing;
a spring seat that is fitted on the fitting protrusion to be seated on the friction block, and has a seat-protrusion surface at the bottom of which is a slope contacting the friction block; and
an inner spring and an outer spring each of which one end is supported against an upper inner surface of the housing and the other end is supported by the spring seat,
wherein a plurality of anti-rotating portions that protrudes in parallel with each other from the pedal arm toward the fitting protrusion is integrally formed at a side of the friction block mounting groove in the longitudinal direction of the pedal arm, and
a seat block that is inserted between the anti-rotating portions and stuck therein to prevent the spring seat from rotating is formed on the outer circumference of the spring seat.

* * * * *